United States Patent [19]
Chen

[11] Patent Number: 5,178,467
[45] Date of Patent: Jan. 12, 1993

[54] CLINIC THERMOMETER WITH SOOTHER

[76] Inventor: Chean S. Chen, No. 33, 16 Aly, 313 Ln, Shian St., Peitou Dist., Taipei, Taiwan

[21] Appl. No.: 845,721

[22] Filed: Mar. 4, 1992

[51] Int. Cl.⁵ .................. G01K 13/00; G01K 7/02; A61B 5/00
[52] U.S. Cl. .................. 374/151; 374/179; 128/736; 606/234
[58] Field of Search .............. 374/151, 179, 208; 128/736; 606/234

[56] References Cited

U.S. PATENT DOCUMENTS

| | | | |
|---|---|---|---|
| 4,813,790 | 3/1989 | Frankel et al. | 128/736 |
| 5,013,160 | 5/1991 | Massey et al. | 374/151 |
| 5,019,864 | 5/1992 | Lu | 374/151 |
| 5,033,864 | 7/1991 | Lasecki et al. | 374/151 |

FOREIGN PATENT DOCUMENTS

| | | | |
|---|---|---|---|
| 0166069 | 1/1986 | European Pat. Off. | 374/151 |
| 0039434 | 4/1981 | Japan | 374/151 |
| 0018425 | 1/1984 | Japan | 128/736 |
| 0120030 | 6/1986 | Japan | 128/736 |
| 2163855 | 3/1986 | United Kingdom | 128/736 |
| 8302664 | 8/1983 | World Int. Prop. O. | 128/736 |

Primary Examiner—William A. Cuchlinski, Jr.
Assistant Examiner—Diego F. F. Gutierrez
Attorney, Agent, or Firm—Bacon & Thomas

[57] ABSTRACT

A clinic thermometer comprises a thermometer body which has a display and electrical circuits related thereto mounted therein and a temperature sensing member which is flexibly embedded in a soother detachably mounted on the thermometer body with the temperature sensing member in communication with the electric circuits formed inside the thermometer body to show the detected body temperature of a child with the display. A similar temperature sensing member may also be fixed inside a probe which can replace the soother and detachably mounted on the thermometer with the temperature sensing member in communication with the thermometer body for measuring the body temperature of an adult.

7 Claims, 2 Drawing Sheets

CLINIC THERMOMETER WITH SOOTHER

FIELD OF THE INVENTION

The invention relates generally to a human body temperature sensing device and in particular to a clinic thermometer which has a soother detachably connected thereto with a thermo-sensor flexibly embedded therein for sensing body temperature when the soother is placed inside a user's mouth.

BACKGROUND OF THE INVENTION

Conventional clinic thermometers are either in the form of a mercury tube or of the type of a probe. These kinds of clinic thermometer are usually in detestation by young children, especially those aged below ten. A clinic thermometer which has securely integrated thereon a soother has been developed recently. This prior art soother type clinic thermometer, however, has the disadvantage of being very slow in measuring temperature, for soothers are usually made of silicon rubber which in general has a very low heat conductivity. Further, the prior art soother type clinic thermometer has a temperature sensing member which, although secured on the soother, is incapable to flexibly deform in response to the deformation of the soother so that after the soother is distorted either by a child's hands or his mouth, the sensing member is broken down.

It is obvious that with the soother securely integrated with the thermometer, this kind of clinic thermometer is generally for measuring the body temperature of young children, not suit for adults.

It is therefore desirable to have a clinic thermometer which may not cause children's abhorrence when measuring the body temperature of children and it is suitable for both use by adults and by children.

OBJECTS OF THE INVENTION

It is therefore an object of the present invention to provide a clinic thermometer which is detachably attached thereon either a soother or a probe with a temperature sensing member embedded in or attached on the soother or mounted inside the probe.

It is another object of the present invention to provide a clinic thermometer with a soother attached thereon with a temperature sensing member, which is in communication with the display of the thermometer, embedded in the soother or in a piece of a flexible material attached on the soother in such a way that the temperature sensing member is deformable in response to the distortion of the soother.

To achieve the above-mentioned objects, there is provided a clinic thermometer comprising a thermometer body which has a display and electrical circuits related thereto mounted therein and a temperature sensing member which is flexibly embedded in a soother detachably mounted on the thermometer body with the temperature sensing member in communication with the electric circuits formed inside the thermometer body to show the detected body temperature of a child with the display. A similar temperature sensing member may also be fixed inside a probe which can replace the soother and detachably mounted on the thermometer with the temperature sensing member in communication with the thermometer body for measuring the body temperature of an adult.

Other objects and advantages of the invention will be apparent from the following description of the preferred embodiments taken in connection with the accompanying drawings wherein:

DETAILED DESCRIPTION OF THE PREFERRED EMBODIMENTS

Figure 1:
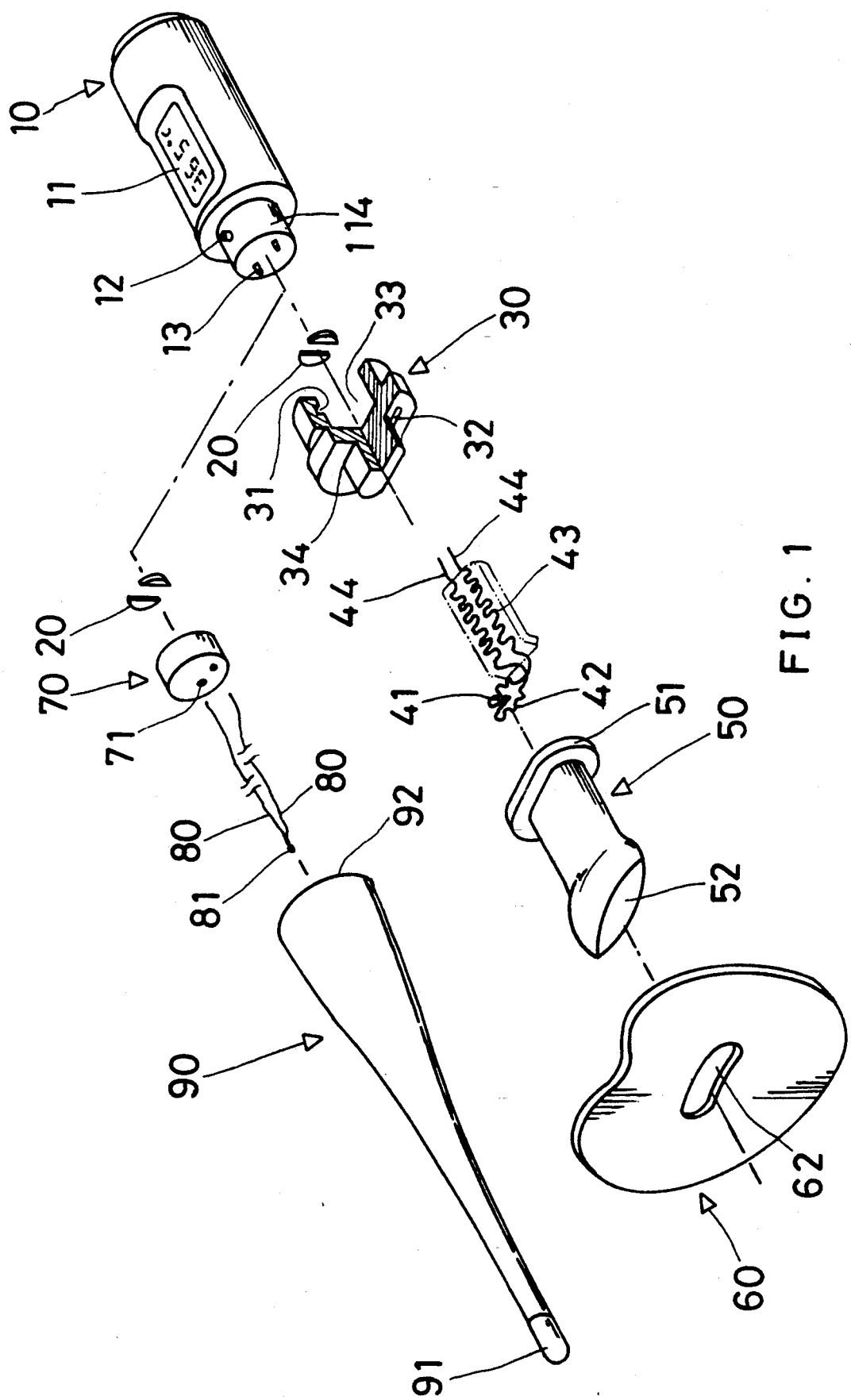
FIG. 1 is a perspective fragmental view of a clinic thermometer in accordance with the present invention showing both the soother type sensor and the probe type sensor therein.

With reference to the drawings and in particular to FIG. 1, a clinic thermometer in accordance with the present invention comprises a thermometer body 10 in which a display 11 is formed and in connection with circuits (not shown) inside the thermometer body 10. An adapting member 14 with electrical terminals 13 formed thereon is formed on one end of the thermometer body 10 to detachably engage with a coupler member 30. The electrical terminals 13 are in electrical connected with the circuits inside the thermometer body 10. The thermometer body 10 has a switch 114 (see FIGS. 2 and 3) formed thereon to turn on/off the device.

The coupler member 30 has a recess 33 generally complementary to the adapting member 14 of the thermometer body 10 so as to receive the adapting member 14 of the thermometer body 10 therein to accomplish the engagement therebetween. Also formed on the adapting member 14 of the thermometer body 10 is a projection 12 which engages with an interior slot 31 formed on the recess 33 of the coupler member 30 to prevent the coupler member 30 from being disconnecting from the thermometer body 10.

The interior slot 31 is in the form of an L shape, namely having a first section thereof extending substantially parallel with the depth direction of the recess 33 and a second section thereof substantially on the circumferential direction of the recess 33 so that when the projection 12 enters the slot 31 from the first section thereof and then moves to the second section thereof by the rotation of the coupler member 30 with respect to the thermometer body 10, the coupler member 30 is held on the thermometer body 10. Obviously, other means having similar function can be adapted.

A soother 50 which has a circumferential flange 51 formed on a first end thereof, which is an open end, and a flat portion 52 formed on a second end is mounted on the coupler member 30 with the circumferential flange 51 abutting against a step 34 formed on the coupler member 30. Further referring to FIG. 2, a temperature sensing member 41, preferably a thermistor, is embedded in the flat portion 52 of the soother 50 and has connected thereto two leads 44 which are embedded in the soother 50 and run through a through hole 32 formed on the coupler member 30 to electrically contact the electrical terminals 13 of the thermometer body 10 via two resilient contacting members 20. In FIG. 1, the leads 44 form a first serpent portion designated by the reference numeral 42 inside the flat portion 52 of the soother 50 to enhance the sensitivity and the coherence thereof with the soother 50. The leads 44 also form a second serpent portion designated by the reference numeral 43 to increase the flexibility thereof inside the soother 50.

Although in this embodiment, the leads 44 are embedded in the material which forms the soother 51, it is apparent to those skilled in the art that the leads 44 may be embedded in a separate piece of flexible material which is fixed inside or on the soother 50. This by no means adversely affects the function of the clinic thermometer of the present invention.

To securely hold the soother 50 and the coupler member 30 together, a skirt member 60 with an opening 62 defined substantially on the center thereof to receive therein the soother 50 is mounted on the soother 50 and resting on the flange 51 of the soother 50. The skirt member 60 further has a depending flange 61 formed thereon around the central opening 62 to tightly fit on the flange 51 of the soother 50 and the coupler member 30 and thus holding them together.

Figure 2:
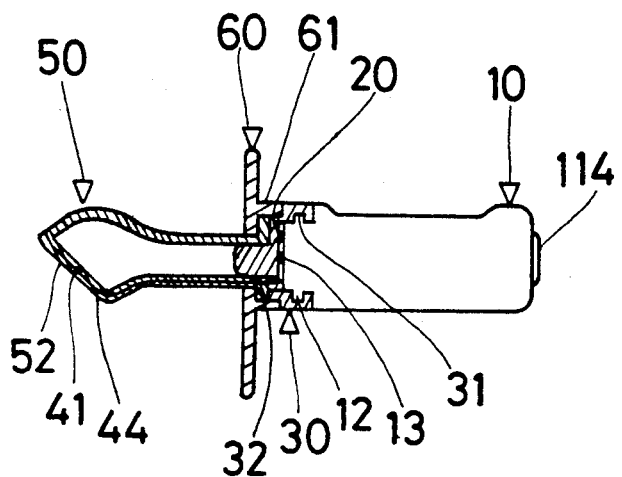
FIG. 2 is a side elevation view of the clinic thermometer shown in FIG. 1 when the soother type sensor is used, the soother being broken away to show the interior thereof.
Figure 3:
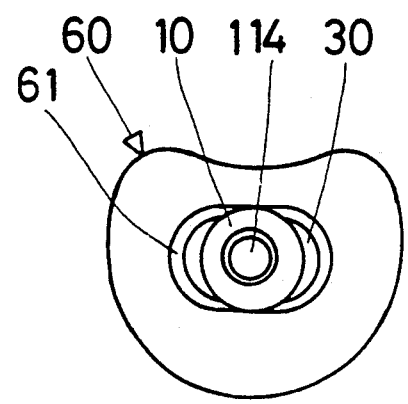
FIG. 3 is an end view of the clinic thermometer shown in FIG. 2.
Figure 4:
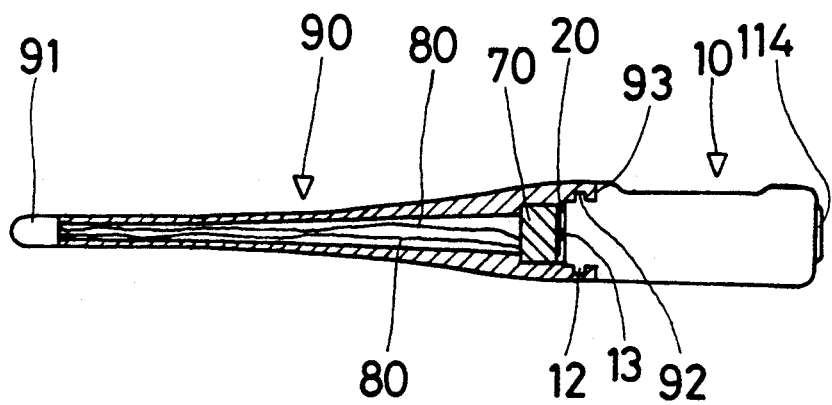
FIG. 4 is a side view similar to FIG. 2 with the soother in FIG. 2 being replaced by the probe shown in FIG. 1.

Referring now to FIGS. 1 and 4, the soother 50 shown in FIG. 2 can be replaced with a hollow probe 90 (as shown in FIG. 4) when the clinic thermometer of the present invention is intended to measure the body temperature of an adult. The probe 90 has a sharpened end with a metal cap 91 mounted thereon to insert into the mouth of a user and an open, enlarged end 93 to directly and detachably connect to the adapting member 14 of the thermometer body 10 by means of the engagement of the projection 12 of the thermometer body 10 and a slot 92 formed inside the open end 93 of the probe 90. The slot 92 is similar to the slot 31 formed inside the recess 31 of the coupler member 30 in both structure and function so that the probe 90 can be detached from the thermometer body 10 as the soother 50 described with reference to FIG. 2.

A temperature sensing member 81 is mounted inside the probe 90 in the vicinity of the metal cap 91 and has two leads 80 connected thereto and running through slots 71 formed in an intermediate block 70 to electrically contact the electrical terminals 13 of the thermometer body 10 via the resilient contacting members 20. The intermediate block 70 is inserted inside the probe 90 for securing the leads 80 and keeping the contacting members 20 in position to form electrical connections between the leads 80 and the electrical terminals 13.

To this point, it is understood that the present invention provides a clinic thermometer which has a soother type sensor for using with young children and a probe type sensor for using with adults. Both the soother type sensor and the probe type sensor have a similar connecting structure so that they can exchange with each other and used with the same thermometer body.

It is apparent that although the invention has been described in connection with the preferred embodiments, it is contemplated that those skilled in the art may make changes to certain features of the preferred embodiments without altering the overall basic function and concept of the invention and without departing from the spirit and scope of the invention as defined in the appended claims.

What is claimed is:

1. A clinic thermometer comprising:
   a thermometer body which has formed thereon a display in connection with circuits inside said thermometer body and an adapting member formed on one end thereof with a plurality of electrical terminals formed thereon, said electrical terminals being in connection with the circuits inside said thermometer body; and first and second interchangeable temperature sensing means, wherein said first temperature sensing means comprises
   a soother which has an open first end and a flat portion formed on a second end thereof with a coupler member received and secured inside said open first end, said coupler member being further connected to said adapting member of the thermometer body in a detachable way, said soother comprising a first temperature sensing member which is embedded in said flat portion of the soother with two conductive wires connected thereto, said conductive wires forming at least a first serpent portion embedded in said soother, said conductive wires running through holes formed on said coupler member to contact said electrical terminals of the adapting member; and wherein said second temperature sensing means comprises
   a hollow probe which has a sharpened end with a metal cap mounted thereon sized for inserting into the mouth of a user and an open end for directly and detachably connecting to said adapting member, said hollow probe comprising a second temperature sensing member disposed therein in the vicinity of said metal cap with two conductive wires connected thereto running through said probe to contact said electrical terminals formed on said adapting member.

2. A clinic thermometer as claimed in claim 1 wherein said two conductive wires of the first temperature sensing member further form a second serpent portion to enhance the flexibility thereof.

3. A clinic thermometer as claimed in claim 2 wherein said second serpent portion of the conductive wires is embedded in said soother.

4. A clinic thermometer as claimed in claim 2 wherein said second serpent portion of the conductive wires is embedded in a separate piece of a flexible material which is attached on said soother.

5. A clinic thermometer as claimed in claim 1 wherein said thermometer body has a switch formed thereon to turn on/of said clinic thermometer.

6. A clinic thermometer as claimed in claim 1 wherein said first temperature sensing member is a thermistor.

7. A clinic thermometer as claimed in claim 1 wherein said second temperature sensing member is a thermistor.

* * * * *